United States Patent [19]

Salmonsen et al.

[11] 4,344,493
[45] Aug. 17, 1982

[54] HIGH-SPEED WEIGHING AND CONVEYING APPARATUS

[75] Inventors: Andrew R. Salmonsen, Pennsauken, N.J.; William J. Feehery, Jr., Ardmore, Pa.

[73] Assignee: Campbell Soup Company, Camden, N.J.

[21] Appl. No.: 241,121

[22] Filed: Mar. 6, 1981

[51] Int. Cl.³ .................... G01G 13/00; G01G 19/00; B07C 5/16
[52] U.S. Cl. .................................... 177/52; 177/145; 198/504; 209/592
[58] Field of Search .................... 209/592; 177/52–54, 177/145; 198/504

[56] References Cited

U.S. PATENT DOCUMENTS

| 1,192,852 | 8/1916 | Bruton . | |
|---|---|---|---|
| 2,359,786 | 10/1944 | Pechy . | |
| 2,521,876 | 9/1950 | Stake . | |
| 2,661,091 | 12/1953 | Maloney . | |
| 3,180,475 | 4/1965 | Del Rosso . | |
| 3,434,595 | 3/1969 | Seaborn et al. | 177/52 X |
| 3,955,665 | 5/1976 | Pettis, Jr. et al. | 177/145 X |

FOREIGN PATENT DOCUMENTS 236600 12/1961 Australia .

Primary Examiner—George H. Miller, Jr.
Attorney, Agent, or Firm—Albert L. Free

[57] ABSTRACT

A high-speed weighing and conveying system, suitable for use in filling soup cans and weighing each as it passes over a weigh platform to a can closer. The open-topped cans slide smoothly and in positive index at all times through a filler and then, in sequence, to an accelerating screw conveyor, to a weigh conveyor which guides them as they slide over the weighing platform, to another screw conveyor, and to a further conveyor which delivers them at the proper times to a closer; an automatic rejector is preferably positioned between the second screw conveyor and the closer to remove from the train of cans, prior to the closer, any can which with its contents has an unacceptable weight. The top portion of the weighing platform is in the form of a longitudinally extending channel member, and the weigh conveyor comprises a pair of rails extending through the channel to support a pair of roller chains having outwardly-extending spaced lugs. The rails are supported independently and free of the platform, and the lugs extend upwardly through the channel to above the top surface of the platform on which the cans slide, in a position behind each can to guide its sliding motion while leaving it essentially free as it traverses the platform. All conveyors, the filler and the closer are synchronized and phased by positive drive from a common drive motor.

24 Claims, 12 Drawing Figures

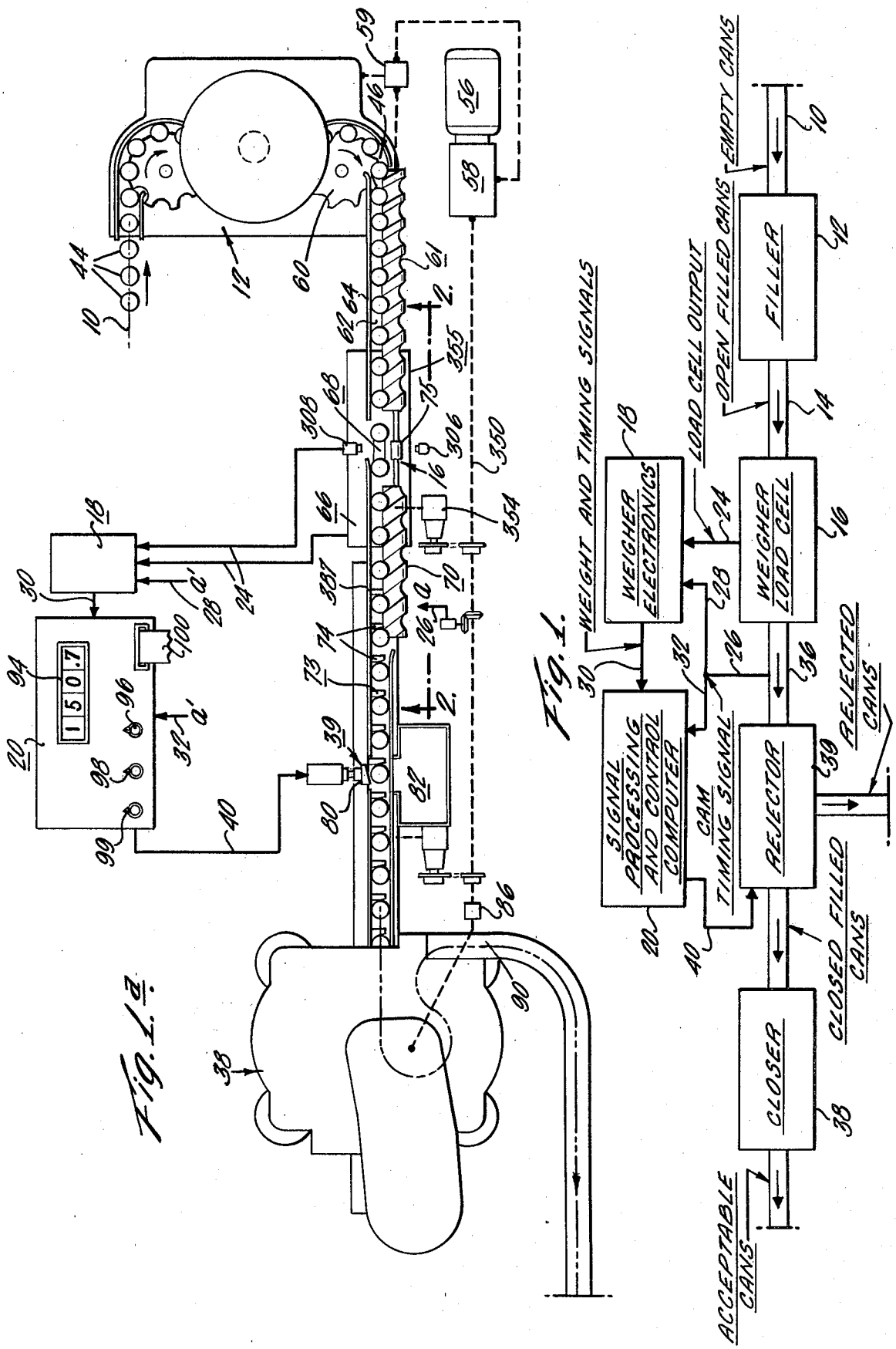

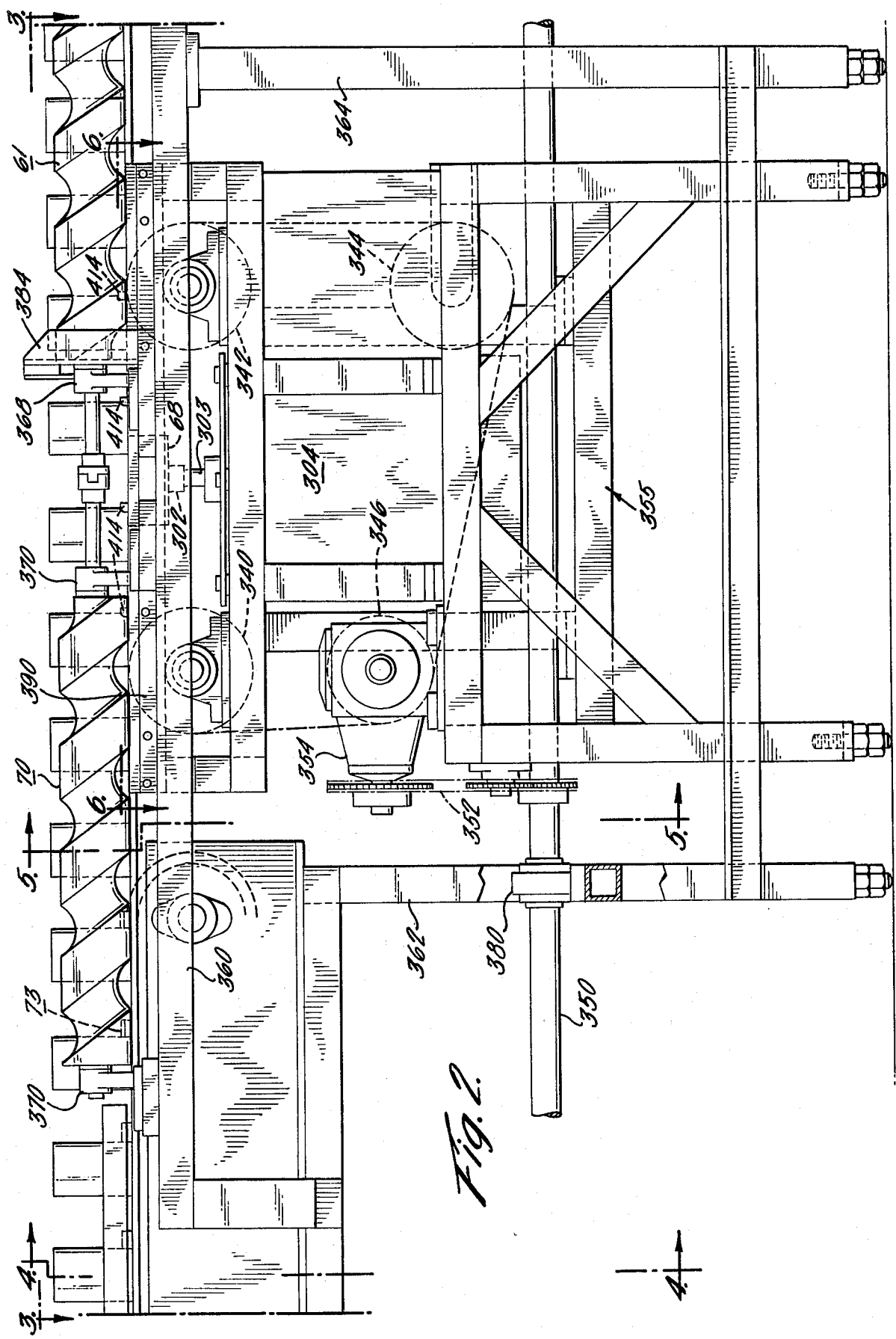

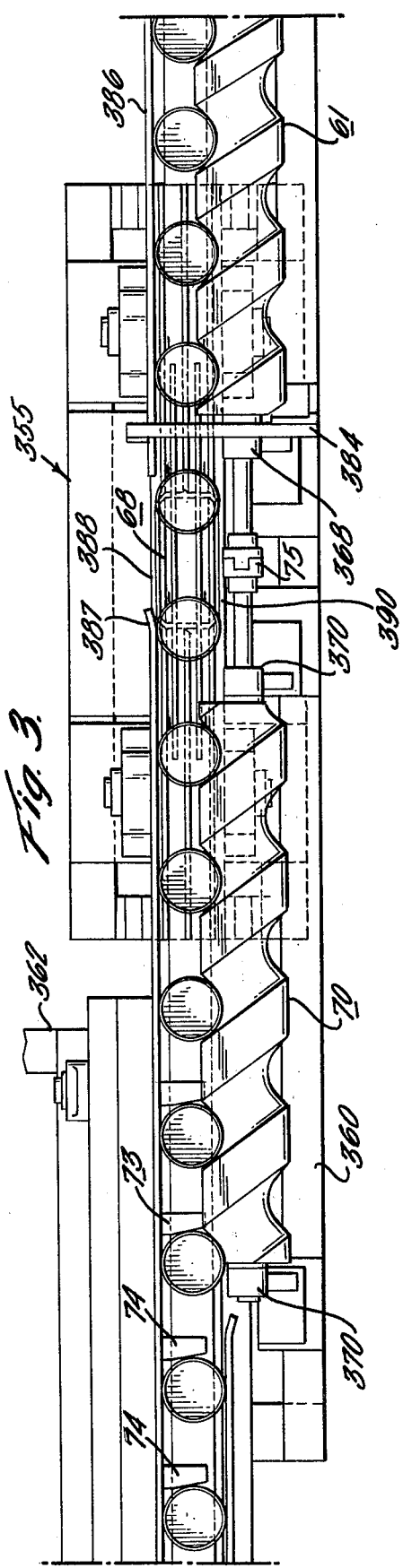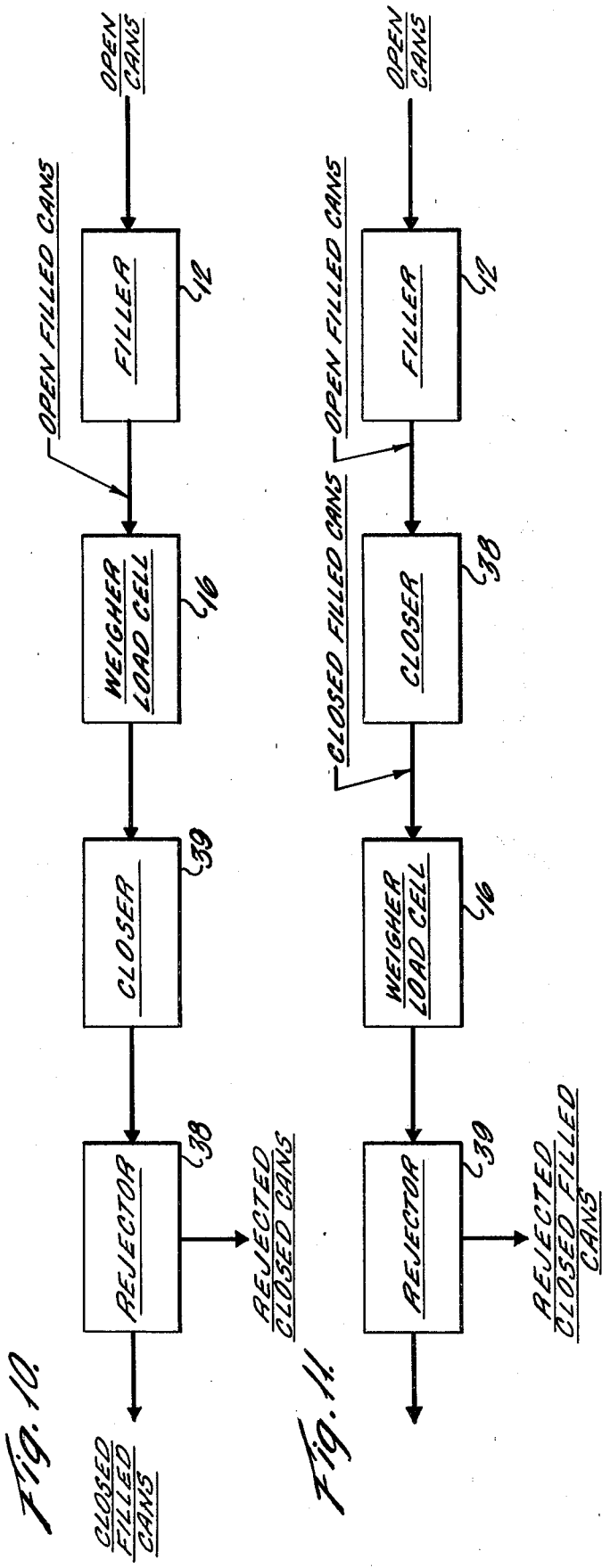

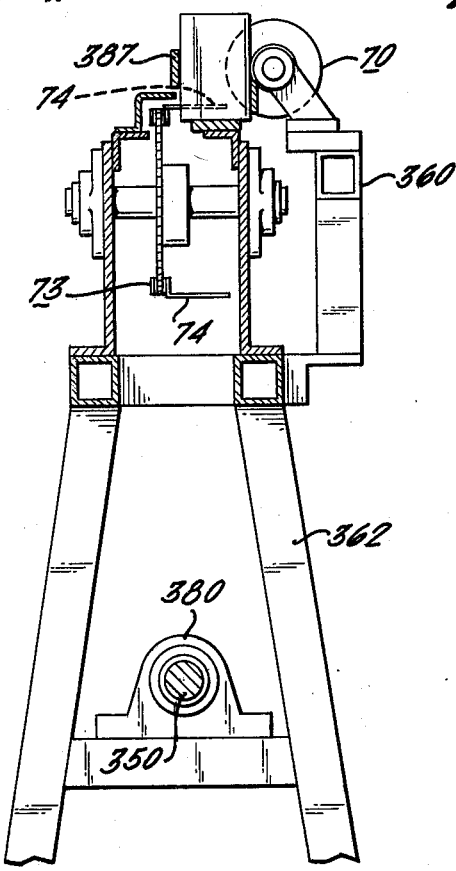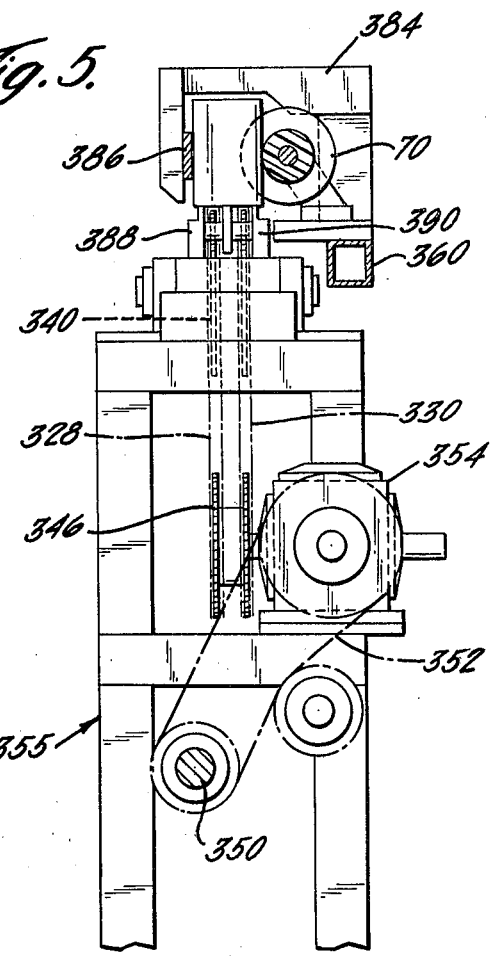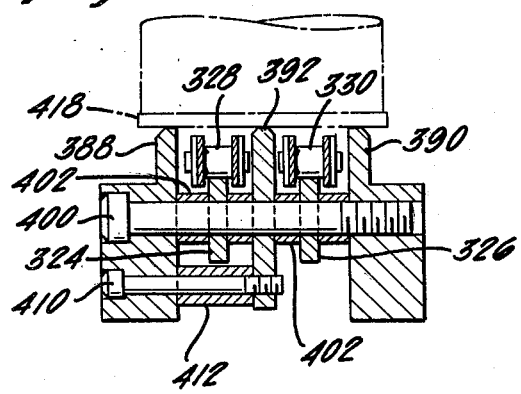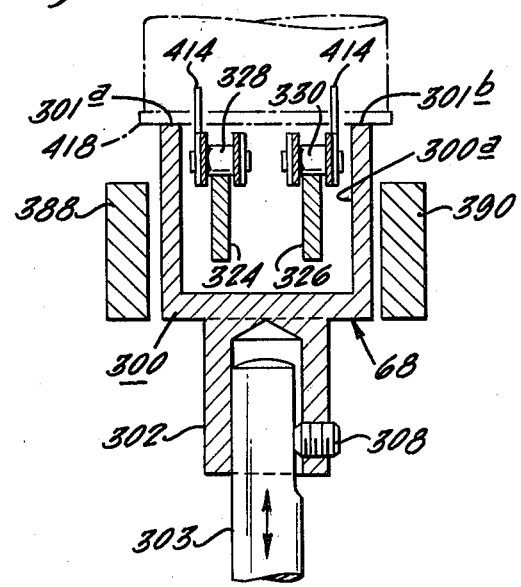

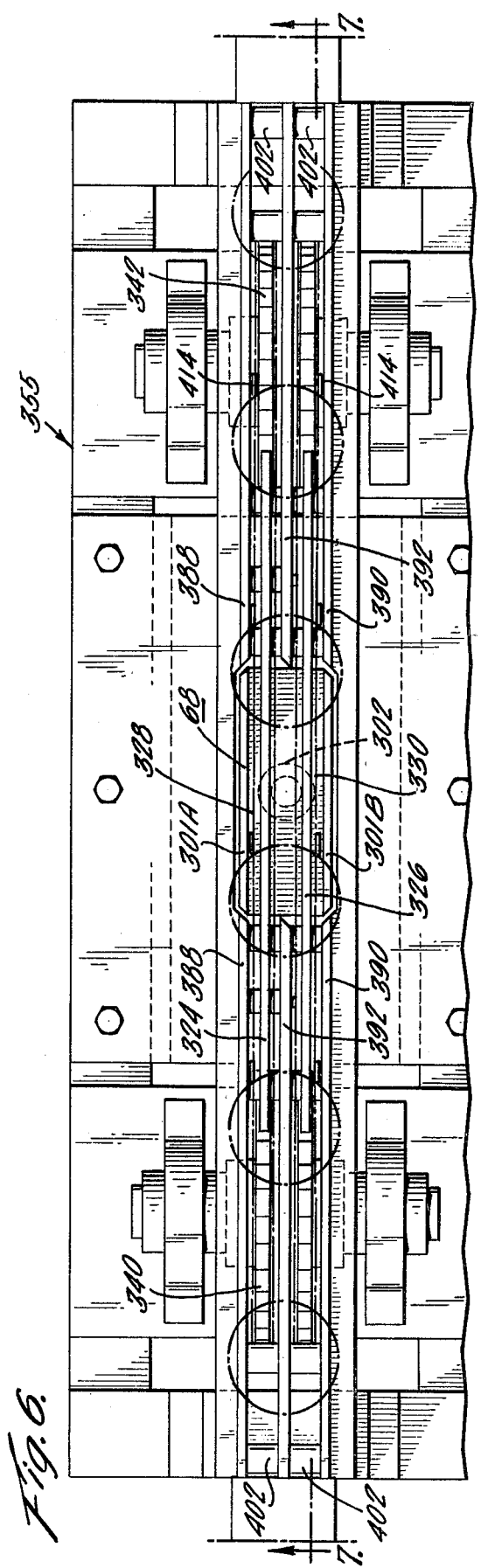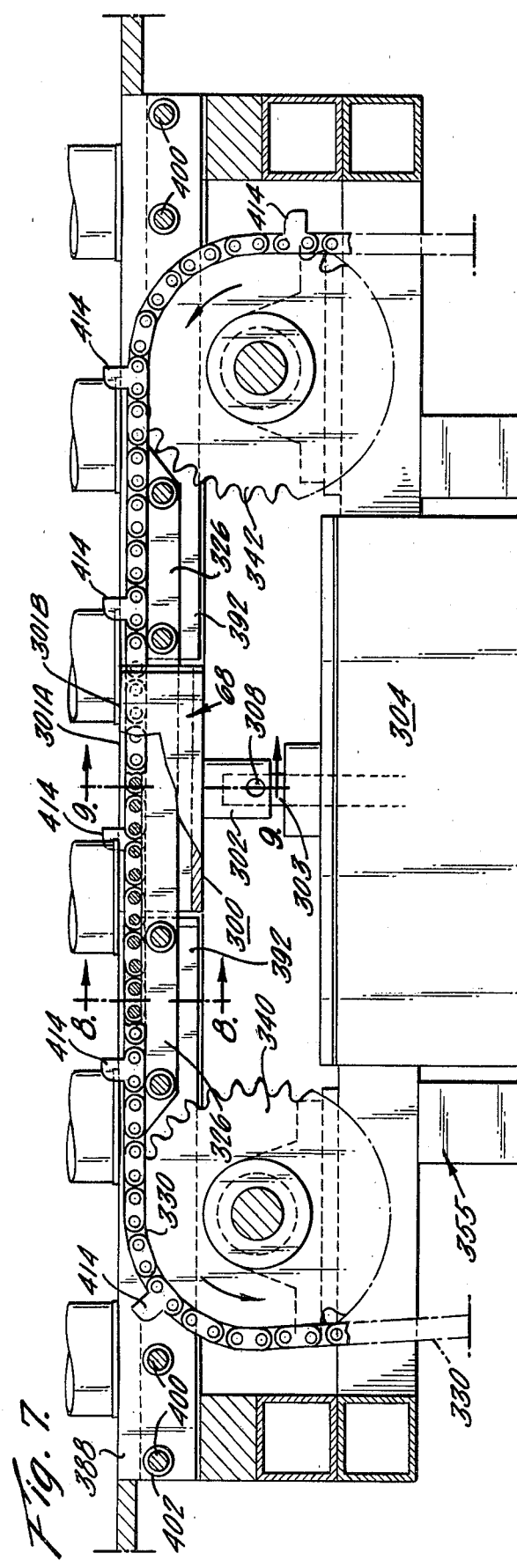

HIGH-SPEED WEIGHING AND CONVEYING APPARATUS

BACKGROUND OF THE INVENTION

This invention relates to apparatus for the high-speed weighing and conveying of objects, and is especially applicable to such weighing and conveying of open-topped containers of readily-flowable products.

Various forms of apparatus are known in the prior art for accomplishing the accurate yet rapid sequential weighing of objects which are moved over a weighing device in a rapidly moving train. Such high speed weighing is especially useful, for example, in connection with the mass production of products in containers, especially where it is important or necessary to be sure that each such container does in fact contain at least the weight of the product which it is represented to contain. One such type of container with respect to which the invention will be particularly described is a soup can nearly filled with soup. Other examples include, without limitation, cans of other types of food products, food packaged in containers other than cans, cans of oil, or containers of other non-food products. In some cases it may also be desirable to weigh objects other than containers of product, for example any object having a predictable exterior configuration which it will retain during normal processing and handling.

While weighing of objects one at a time at slow rates has been possible for a long time, for mass production purposes one is often interested in weighing objects at high rates such as from 300–600 objects per minute, which is 5 to 10 objects per second, and to do so reliably has presented a substantial technological challenge.

One known manner for accomplishing such high speed weighing is described and claimed in U.S. Pat. No. 3,800,893 of Joseph D. Ramsay and George R. Weaver, filed Sept. 5, 1972 and issued Apr. 2, 1974 for Weighing Apparatus and Method. In this weighing system, a pair of parallel motor-driven chains carry a train of objects to be weighed across the spring-mounted weigh platform of a weigh cell having a platform which is at all times free to oscillate or vibrate vertically in response to the weights of the objects, and which senses the instantaneous vertical displacement, vertical velocity and vertical acceleration of the vertically-vibrating weighing platform, derives the second-order differential equation of motion of the platform along the vertical direction in response to the weight of the object and chain, and from this computes the weight of each object; the vertical motion information described above may be derived over the course of a few vibrations of the platform, or in as little as $\frac{1}{4}$ of a cycle of such vibration. The maximum vertical displacement of the weigh platform from its rest position during the weighing operations is extremely small, typically less than 0.001 inch, and less than 0.005 inch in nearly all applications of practical interest.

U.S. Pat. No. 4,151,890 of Alec B. Smith, filed Oct. 17, 1977, issued May 1, 1979 and entitled WEIGHING APPARATUS describes and claims an improved version of the high-speed weighing device of U.S. Pat. No. 3,800,893 which is simpler in form and less expensive than the embodiment of 3,800,893 and is also capable of accomplishing weighing of objects passing over it at time intervals of only a small fraction of a second and with very small vertical displacements of the weigh platform during weighing, again typically less than about 0.001 inch and in substantially all practical cases less than about 0.005 inch.

In both of the above-described previously known high-speed weighing devices, the chain passes over the weigh platform and is weighed along with the objects to be weighed; the weight of the chain is, in effect, subtracted out to produce the desired signals representing object weights. The objects may be placed at random along the chain prior to passing over the weigh platform so long as they are not placed so closely together as to interfere with their individual weighings.

While the above-described two types of high-speed small-deflection weighing devices have proved very useful and advantageous in many applications thereof, both involve the weighing of the chains which pass over the weigh platform, and this can be the source of some weighing error, particularly due to small changes in the degree of tension or slack of the chains, which can produce at least a small variation in the downward force exerted by the chain upon the weigh platform at different times.

In addition, in certain important applications it is desirable to maintain positive indexing of the positions of the objects to be weighed, so as to assure that each object to be weighed has a definite known position at any time, and usually so that the speeds and spacings between the objects are constant while traversing the weighing platform.

More particularly, in some cases it is desirable to employ, downstream or following the weighing device, apparatus which must be fed with each of the objects at precise predetermined times; as an example, the feed-time critical downstream device may be a closer for applying tops to be weighed, open-topped cans containing soup; or it may be some other device which requires operation at a predetermined periodic rate and at predetermined times, such as a labeller, a machine for marking the object, or even a packing device which presents packing positions at predetermined times and to which the weighed objects must be delivered at exactly these times. In some cases one may wish to use a rejector designed to reject from the train of weighed objects those outside of the permissible weight range, and to use for this purpose a type of rejector which anticipates when each object will reach it, and thus relies upon supply thereto of the weighed objects at predetermined predictable times. In the above-described arrangements of the prior art, if the objects to be weighed are initially placed onto the conveyor with random or non-uniform spacings, and/or become variably spaced because of the action of accelerating conveyors and/or because of slippage on the conveyor during their travel to, across or from the weighing device, then the necessary accurately-timed delivery of the objects to apparatus downstream of the weighing device will not be achieved; in some cases the objects may even "back up" and block egress of following objects from the weighing device.

What is desired, instead, is a system which will provide positive indexing in that the position of each object as it leaves the weighing device is positively maintained in known relation to the operation of the corresponding critically-timed downstream apparatus, or as it is sometimes stated, the apparatus "knows" the exact position of each object at least from the time it is leaving the weighing device to the time at which it is received by the downstream apparatus which operates with critical timing.

Further, in certain cases it is important to be able to convey the objects to be weighed to, across and from the weighing device very smoothly, i.e. without sudden acceleration in any direction and in a fixed angular orientation. A typical example of such application occurs in the high-speed weighing of open-topped containers filled, at least partially, with a flowable product, for example open-topped cans filled with soup. High-speed check-weighing of a train of such cans of soup enables automatic rejection of those cans in the train having weights outside of prescribed limits. In such case it is important that no soup be lost from any can via its open top, between filling and closing of the can, and therefore that the filled, open-topped cans be translated very smoothly from filler to closer via the high-speed weigher and via the rejector, if one is used.

U.S. Pat. No. 2,661,091 of N. G. Maloney, issued Dec. 1, 1953 and entitled APPARATUS FOR WEIGHTS CLASSIFICATION discloses a system for the balanced-beam check-weighing of cans of product, by sliding them across a weighing table in response to pushing by cross-bars extending between a pair of endless chains located on laterally opposite sides of the weighing platform. The cans are loaded into position between the cross-bars by what is referred to in the patent as a conventional conveyor, and shown in the patent as comprising a downwardly-inclined surface, without a showing of further detail. Downstream of the weigher, the cans which are out of weight specification are diverted from the train, and those which are acceptable are diverted onto another conveyor at a different angle. The weighing table is supported on a float immersed in a liquid, and its downward acceleration against the buoyancy of the float is sensed and used as an indication of weight compared to a standard. Between each such weighing, the weighing table is forced to return to a rest position flush with the delivery table and the exit table, before another can is received for weighing.

While the weighing system of the reference may be suitable for certain purposes, it appears to have inherent drawbacks for other purposes. First, it appears to be unsuitable for the high-speed weighing of open-topped cans nearly filled with a readily-flowable product such as soup, because of the spillage which would occur. Such spillage would occur because of the tilt of the cans on the inclined conveyor feeding the cross-bar conveyor, because of the mechanical shock in the transfer between these two conveyors, and because of the sudden angular diversion of the acceptable cans onto another conveyor downstream of the weigher. From this it is properly inferred that the cans in the reference must either be closed cans, or else they must not be nearly filled with a readily flowable product.

Secondly, in the system of the reference the speed of weighing is inherently slowed by the requirement that the weighing table be returned to its upward rest position and locked in this position while each new can is moved onto the weighing table.

In addition, there is no teaching in the cited reference of how transfer of the cans can be accomplished without at least momentarily relinquishing positive smooth control of the motion of the cans. There is also no teaching of how the cross-bar conveyor might be interfaced with other conveyors, for example a screw conveyor, to effect smooth, indexed delivery of cans to the cross-bar conveyor or smooth, indexed delivery of cans from the cross-bar conveyor to an exit or downstream screw conveyor.

Accordingly, it is an object of this invention to provide new and useful apparatus for the conveying and weighing of objects.

A further object is to provide such method and apparatus which provides high speed weighing of objects with a high degree of accuracy.

A further object is to provide such apparatus which accomplishes high speed, accurate weighing of objects while maintaining them in positively indexed positions.

Another object is to provide a system for receiving containers to be weighed from the output of a filler, subjecting them to high-speed weighing, and delivering them in properly timed synchronism to a container-processing device, such as a container closer, for example.

A still further object is to provide apparatus for the movement of objects to be weighed, at predetermined fixed spacings, across a high speed weighing device, while retaining the accuracy and reliability of which the weighing device itself is capable.

Another object is to provide rapid delivery to, over, and from a weighing device, of objects to be weighed while maintaining them in predetermined relative positions, and to do so with a smoothness of motion such that, even if the objects comprise open-topped containers nearly filled with flowable material, there will be no spillage of the material from the container.

Another object is to provide apparatus for the high-speed weighing of each of a train of objects, in which there is no effect exerted upon the motion of the weighing platform by the conveyor of the objects, in which the conveying of the objects to, across and from the weighing platform is smooth and without sudden accelerations, and in which the objects remain positively indexed during their conveyance to, across and from the weighing platform.

Still another object is to provide apparatus for the filling of open-topped cans with liquid product at one station, closing of the top of the cans at another station, and high speed conveying of the filled open-topped cans from the filler to the closer by way of a high-speed weigher, while moving the cans smoothly and without spillage from filler to closer, and while maintaining positive indexing of the cans throughout, and without weighing any part of the conveying apparatus.

A further object is to provide a new and useful conveyor and weigher arrangement for moving objects to be weighed across a weigh platform.

Another object is to provide the latter type of arrangement, to and from which objects can be conveyed smoothly and with positive indexing by one or more screw conveyors.

SUMMARY OF THE INVENTION

These and other objects of the invention are achieved by the provision of apparatus comprising weighing means which includes a horizontal weighing platform having a top surface across which objects to be weighed can be slid, the weighing means being of that class in which the platform is spring-mounted so as to be free at all times to execute vertical vibratory motion in response to the weights of objects sliding across its top surface, the amplitude of such vibrations being small, e.g. preferably of the order of from less than 0.001 inch to about 0.005 inch, depending on the weights of the objects; the objects are delivered to the weighing platform by an object-delivery conveyor means which slides them along object-delivery track means to a position adjacent the platform top surface, whence they are surrendered to the control of weigh conveyor means which guides their sliding onto and across the platform top surface to a downstream object-receiving track means, along which they are slid by an object-receiving conveyor means. The exit end of the object-delivery track means is preferably substantially aligned with the position of the platform when the platform is at the highest position which it attains during its vibratory motion in response to weighing of previous objects, so as to minimize shock to the object and the platform during delivery of the object to the platform; the entrance end of the object-receiving track means is preferably substantially aligned with the position of the exit end of the top surface of the platform when the platform is at its lowest position in its vibratory motion, to minimize shock to the objects as they leave the platform. The weighing means includes means responsive to the vertical vibratory motion of the platform to produce signals representative of parameters of said motion, and to derive therefrom weight-indicating signals indicative of the individual weights of the objects; the preferred parameters for this purpose are the instantaneous vertical displacement, velocity and acceleration of the platform produced by each object individually. The object-delivery conveyor means also maintain positive indexing contact with each of said objects as it slides along the object-delivery track means.

The weigh conveyor means is supported independently and free of the weighing platform so that the weighing means weighs only the objects; it assumes positive indexing control of the objects before they are released by the object-delivery conveyor means, and retains positive indexing control until such control is assumed by the object-receiving conveyor means. The weigh conveyor means preferably has a portion running along the length of the platform beneath its top surface, and the platform is provided with a longitudinally extending channel through which object-contacting means extend upwardly from the conveyor means to contact the trailing edge of the object, preferably at least at two positions on opposite sides of the centerline of the object. The object is therefore substantially free in its sliding motion across the platform as is desired for accurate weighing, yet is positively indexed and guided into the control of the downstream object-receiving conveyor means. In a preferred form the weigh conveyor means comprises a pair of parallel rails extending longitudinally through said channel means for supporting a corresponding pair of parallel roller chains each rolling along a different one of said rails, said object-contacting means comprises lugs on said chains, and the top surface of the platform on which said objects slide is preferably in the form of narrow rails to reduce friction with said objects.

Means are also provided for maintaining proper synchronization and phasing of the positive indexing elements of the three conveyor means, i.e. the object-delivery conveyor means, the weigh conveyor means, and the object-receiving conveyor means, and for this purpose there is preferably provided a conveyor motive source and positive drive means connecting the common motive source to drive all three of the conveyor means.

In a preferred form of the invention it is applied to the high-speed sequential weighing of a train of open-topped cans containing readily-flowable product such as liquid food products, of which soup is an example. In such case the system may comprise a filler through which the open-topped cans are continuously moved in positively-indexed positions as they are filled, after which they are passed into control of the positively-indexed object-delivery conveyor means such as a screw conveyor, which may have a variable pitch such as to change the can spacing to that which is optimum for the weighing operation and to deliver the cans at uniform spacing and speed to the weigh conveyor means. The filler is synchronized and phased, through positive drive from the common motive source, so that the open-topped filled cans are delivered smoothly into the control of the screw conveyor. In such system, the open-topped filled cans exiting from the weigher are delivered by the object-receiving conveyor means, which may comprise another screw conveyor of selected pitch, to a downstream can-handling apparatus which must be supplied with the cans at predictable periodic times, and to this end is driven from the common motive means by appropriate positive drive means; such downstream apparatus may, for example, comprise a can closer for applying a lid to the can, and/or a can rejector actuated by signals produced by the weigh computer when the signals from the weighing means indicate that the weight of a filled can is not acceptable. Analogous downstream apparatus requiring critically-timed delivery of objects to it may be used when the objects are other than open-topped filled cans. In such a system, the objects are slid rapidly but smoothly from the filler across the weighing platform to the critically-timed downstream apparatus, with positive index of the objects maintained throughout, and with the capability of providing changes of speed and spacing of objects at various points in the system as required or desirable.

BRIEF DESCRIPTION OF FIGURES

These and other objects and features of the invention will be more readily understood from a consideration of the following detailed description taken with the accompanying drawings, in which:

FIG. 1 is a block diagram of a system employing a preferred embodiment of the invention;

FIG. 1a is a schematic plan view, with various details omitted, of a system corresponding to that of the block diagram of FIG. 1;

FIG. 2 is a side elevational view of a portion of the system if FIG. 1a;

FIG. 3 is a plan view of the portion of the system shown in FIG. 2;

FIG. 4 is a sectional view taken along lines 4—4 in FIG. 2;

FIG. 5 is a sectional view taken along lines 5—5 of FIG. 2;

FIG. 6 is an enlarged plan view taken along lines 6—6 of FIG. 2, with the screw conveyor removed;

FIG. 7 is a sectional view taken along lines 7—7 of FIG. 6;

FIGS. 8 and 9 are sectional views taken along lines 8—8 and 9—9 of FIG. 7, respectively.

FIGS. 10 and 11 are block diagrams of some other forms of system to which the invention is applicable.

DETAILED DESCRIPTION OF SPECIFIC EMBODIMENTS

Referring now to the specific embodiments of the invention shown by way of example in the drawings, and without in any way thereby limiting the scope of the invention, FIG. 1 illustrates in block form one type of system to which the invention is applicable. Here it is assumed that the invention is applied to the check weighing of open-topped cans of soup, with the objective of automatically removing from the train of cans those which differ from a predetermined weight by more than a prescribed amount. Thus, a sequential train of empty soup cans is provided on conveyor 10, which delivers them to a filler 12 which is intended to fill them to exactly a predetermined level, which it usually does. The open-topped filled cans are delivered by conveyor 14 to the weighing apparatus, which includes a weigher load cell 16, weigher electronics 18 and signal processing and control computer 20. The weigher load cell 16 is preferably of the type described in the above-cited U.S. Pat. No. 4,151,890, which delivers to weigher electronics 18, over line 24, load cell signals indicative of when each can reaches a predetermined position on the weigh platform of the load cell, as well as signals representative of the instantaneous vertical displacement, velocity and acceleration with which the platform moves in response to the weight of each filled can as it traverses the weigh platform. Also supplied to weigher electronics 18, over lines 26 and 28, are cam timing signals derived from appropriate cam pick-off means on a common drive shaft for the several conveyors in the system. The suitably processed weight and timing signals from weigher electronics 18 are supplied over line 30 to signal processing and control computer 20, and the cam timing signal is also supplied thereto over line 26 and 32.

Computer 20 responds to the signal supplied to it to compute the weight of each object, and to operate a rejector if the weight of any can is outside prescribed limits, as described more fully hereinafter. The detailed circuitry and functions of the weigher electronics and computer 20 are fully set forth in the above-identified U.S. Pat. Nos. 3,800,893 and 4,151,890, and need not be repeated herein.

In the system of FIG. 1, the open-topped filled cans from the weigher load cell 16 are delivered by a conveyor 36 to a can closer 38 of known design, which applies the lid to the can and appropriately seals it. Between the load cell and the closer 38 is a can rejector 39 which normally permits the cans to pass through it to the closer 38, but which is actuated in response to a signal from computer 20 over line 40 to remove from the train of cans any can having a weight outside the permitted range of weights; the cans reaching and leaving the closer are then known to be properly filled. The rejected cans may be automatically dumped during rejection and thus emptied, so that they can be used again.

FIG. 1a is a schematic view, corresponding approximately to a top plan view, which is arranged according to the block diagram of FIG. 1; it will be understood that various of the details shown in FIGS. 2-8 have been omitted in the interest of clarity.

In FIG. 1a there is shown a volumetric filler 12 which automatically fills each of a train of soup cans such as 44 with the soup product. The cans are fed to the volumetric filler in any appropriate manner, and are automatically moved through it to its outlet at 46. A common motive source in the form of electric motor 56 is mechanically connected to filler 12, as indicated by the broken-line linkages, by means of appropriate transmissions, gears and direction changers such as 58 and 59, to control the speed and timing with which the cans are moved through the filler.

Filler 12 contains a dispenser section (not shown) positioned above the tops of the open cans, which operates automatically to dispense the soup product into the cans as they pass through the filler, so as to produce the desired soup level therein. At the outlet 46 of the filler, the filled cans are delivered by a wheel 60 to the inlet end of a screw conveyor 61, screw conveyor 61 being synchronized with the filler 12, as shown by the broken lines representing appropriate mechanical linkages, so that the filled cans from the filler slide smoothly into the inlet end of conveyor 61. It will be understood that the speed and phase angle of the screw conveyor 61 is accurately synchronized with respect to the speed of rotation and phase angle of the filler so that it will present exactly the same angular position to each successive can leaving the filler station, and this angular position will be that for which the screw conveyor will properly assume control of the motion of the can.

In this example the conveyor 61 is an accelerating conveyor in that it has a gradually increasing pitch from its inlet end to near its outlet end. While this does produce acceleration of the filled cans, its primary purpose in the present example is to increase the spacing between them to the optimum value for which the weigher load cell 16 is designed to operate. For reasons which will become more apparent hereinafter, however, the portion of screw conveyor 61 near its outlet end is of uniform pitch so that the cans are moving at a uniform velocity prior to their exit from the screw conveyor.

Still referring to the schematic view of FIG. 1a, the outlet end of screw conveyor 61 extends over the weighing station 66, but releases control of the cans prior to the time at which they reach the weighing platform 68. Upon release from accelerating screw conveyor 61, the cans slide along appropriate tracks and across the weighing platform 68 to the inlet end of another screw conveyor 70, which receives the weighed cans and delivers them slidingly to the control of another conveyor system 73 comprising horizontal flights such as 74. The action of the latter flights 74 is synchronized in speed and phase with screw conveyor 70 through common connection with drive motor 56, as indicated by the broken lines. Flights 74 may each extend horizontally from one side of an endless chain drive, the upper run of which extends horizontally along one side of the train of cans; the chain drive is positioned so that each flight moves upward to a position against and behind a corresponding can shortly prior to exit of the can from conveyor 70. While screw conveyor 70 may be of variable pitch in part, so as to produce either an accelerating or a decelerating action with corresponding widening or narrowing of the spacing between cans, the exit portion of the screw conveyor 70 is of uniform pitch corresponding to the distance between the flights 74 so as to achieve a smooth transition from screw conveyor 70 to the subsequent control of one of the flights 74. It is noted that the screw conveyor 70 is connected to and driven by the shaft of conveyor 60, by means of coupling 75.

The cans, urged along by the flights 74, slide through the can rejector station 39, where any can having an unsatisfactory weight may be removed from the train of cans. In this example this may be accomplished by means of an electrically triggerable solenoid plunger 80 positioned at one side of the train of cans and triggerable by an output signal from computer 20 over line 40 to extend rapidly and momentarily outward, so as to knock the corresponding can from the train and into a suitable reject-receiving bin 82, from which the rejected cans may be retrieved by subsequent reuse.

The cans guided by the flights 74 are slidingly delivered to the closer 38, the operation of which is synchronized with the motor 56 through a mechanical linkage to the common drive shaft, as indicated by broken lines, by way of a suitable gearing and direction changing unit 86. In this example, the closer 38, which applies and seals the lids to the soup-filled cans, is of a type to which the cans must be fed at exactly the right times, in order to be properly received and handled thereby; typically, it includes a rotating member having peripheral, adjacent, spaced-apart can-receiving segments, and which turns continuously so as to move the received cans sequentially through the internal apparatus which provides the closing and sealing functions. After passing around the interior of the closer 38, the cans exit in a sequential train onto outlet conveyor 90, which may be any simple form of conveying device, such as a belt, if the cans travelling therefrom no longer need to be controlled or positively indexed or, if there is still another form of apparatus downstream which requires positive indexing of the cans, conveyor 90 may be of a type employing flights such as 74 or any other suitable type of positive-index conveyor.

In the simplified form shown in FIG. 1a, the computer 20 may include a digital display 94 for showing the weights in grams of the successive soup filled cans, a manual control 96 for setting into the equipment information as to the desired weight of the soup-filled cans, for example 150 grams, and upper and lower limit controls 98 and 99 which can be manually set to indicate to the computer how far above and how far below the desired weight the soup-filled cans can be without triggering the rejector apparatus. A paper printout of the weights of successive cans may also be provided on tape 100, if desired. It will be appreciated that during the normal high-speed operation of the system, the weight readings recur at a rate of as much as 10 a second, making the digital display unsuitable for use at such times, but it remains highly desirable and useful during setting up of the system, during checking of its operation, and during demonstrations of its operation, at which time a single can or several cans widely spaced apart may be run through the system; it is also possible to construct the computer so that it will sample the cans, i.e. display the weights of, for example, every 20th can, thus producing a rate of output indication which can readily be observed.

Considering now the overall operation and function of the general system shown schematically in FIGS. 1 and 1a, empty cans loaded onto inlet conveyor 10 are fed into filler 12. The filler discharges the soup product into each of the cans passing through it, and delivers them to the inlet end of screw conveyor 61, which in this case accelerates them slightly so as to increase their spacing to a distance suitable for the weighing operation and, as will be described in detail hereinafter, in accordance with the invention delivers them smoothly to a weigh conveyor which guides them in their sliding over the weighing platform so that they retain their positive index, i.e. their spacing and speed, for delivery at exactly the right times into the inlet end of screw conveyor 70. Screw conveyor 70 may accelerate, decelerate or not effect the speed or spacing of the cans, but in any event affects their sliding delivery through the rejector 39 to the closer 38 at exactly the proper instants of time; after the can-closing operation, the stream of cans is delivered to the outlet conveyor 90.

Throughout their travel from the filler 12 to the outlet from closer 38, the cans move slidingly and in positive index, such that the computer "knows" exactly where a can will be at any given time. All of the operations described are provided with such smoothness that there is no spilling of the soup product due to roughness of movement, and high speed weighing of each can as it moves slidingly over the weighing platform is achieved, at can rates from 300 up to 600 cans per minute, those cans having weights falling out of prescribed ranges being automatically ejected from the train of cans.

Turning now particularly to FIGS. 2-9, in which parts corresponding to those of FIG. 1a are represented by corresponding numerals, as shown in these figures the weighing platform 68 comprises a horizontal longitudinally extending U-shaped channel portion 300 (FIG. 9) defining a longitudinal channel 300a, the upper ends of which channel portion provide a pair of spaced-apart parallel rails 301a and 301b on which the cans are adapted to slide on their bottom ends; platform 68 also comprises a central, downwardly-extending tubular portion 302, below the U-shaped channel portion, which fits over a vertical rod 303 and is secured thereto by a set screw 308. Indications of the weight of the can passing over the top of the platform are provided by sensing certain characteristics of the vibratory vertical motion of rod 303. More particularly, as described in the above-cited U.S. Pat. No. 4,151,890, the vertical platform-supporting rod 303 is spring-mounted within weigh cell 304 so as to respond to the weight of the cans by executing high-frequency, small-amplitude vibrations along the vertical direction, typically with a vertical deflection of the order of 0.001 inch and in most practical cases less than about 0.005 inch. As an example, the platform will move vertically with a maximum excursion in either direction of about 0.001 inch per pound of weight applied to it; for a weight of about 185 grams, this corresponds to about 0.004 inch maximum deflection.

The above-cited patent describes in detail appropriate motion sensors, contained within the weigh cell 304, for producing electrical signals representing the instantaneous vertical displacement, the corresponding instantaneous vertical velocity, and the corresponding instantaneous vertical acceleration of the weigh platform during a brief interval when the can to be weighed is on a specific predetermined portion of the weigh platform. To provide an electrical indication of when each can occupies such position, a light source 306 and a photocell 308 (FIG. 1a) are provided confronting each other on opposite sides of the weigh platform so that darkening of the photocell and consequent reduction of its current occurs when the leading edge of each can interrupts the light beam. This position-indicating signal, along with the displacement, velocity and acceleration signals are supplied from the weighing station to the weigher electronics over line 24 (FIGS. 1 and 1a) and are used by the signal processing and control computer 20 as described in the above-identified patent to produce computer signals representing the weight of each object, and to compare the weight so determined with a range of permissible weights and produce an output signal to the rejector if the measured weight falls outside the limits of the permitted range.

Extending longitudinally through the central channel or slot 300a in weighing platform 68 are a pair of spaced-apart rails 324 and 326 along which ride a pair of corresponding respective endless-loop lugged roller chains 328 and 330. Lugged chain 328 is supported on three idler sprockets 340, 342 and 344 and a drive sprocket 346, the latter being driven from common drive shaft 350 by an appropriate drive chain 352 and a suitable gearing and direction changing transmission 354.

Gearing and direction changing transmission 354 and the four chain sprockets 340, 342, 344 and 345 are mounted, together with weigh cell 304, on a weigh cell table 355; also supported on table 355 is a rear beam 358. A front beam 360 bridges table 355, and is separately supported by conveyor support means isolated from the weigh cell table 355, for example by pedestals 362, 364. Bearings 368 and 370 for screw conveyors 61 and 70 are mounted on bridging beam 360 to isolate their vibration from weigh cell table 355, and support bearings such as 380 for main drive shaft 350 are also isolated from table 355 by mounting them on other portions of the conveyor support system, as on pedestal 362. A U-shaped overpass structure 384 supported on front beam 360 extends over the top of the path of the cans and supports a side wall 386 which restrains the cans against lateral motion in response to the transverse component of force exerted on them by the screw conveyor, so as to guide the cans along their desired path as they approach the weighing platform; the side wall terminates short of the weighing platform, as does the screw conveyor 61, to permit free sliding motion of the cans over the weighing platform. It will be understood that the side wall also extends along the screw conveyor 61 upstream to the filler, and is supported upstream of the weigh table by additional supporting structure; downstream of the weighing platform, the side wall resumes and is supported from the conveyor support structure downstream of the weigh table 355; the upstream end 387 of this downstream portion of the sidewall is curved slightly outwardly from the path of the cans to assure resumption of guidance by the sidewall without danger of the cans striking the upstream end surface or corner of this portion of the sidewall.

Upstream and downstream of the weighing platform 68, the conveying system includes three parallel rails 388, 390 and 392 on which the cans slide. Rails 388 and 390 are aligned with the rails 301A and 301B of the weighing platform 68; to assist in the smooth sliding of the cans from the upstream rails 388 and 390 onto rails 301A and 301B of the weighing platform, the adjacent confronting ends of the upstream rails and of the weighing platform rail are parallel to each other but are cut at 45° to the longitudinal direction of can motion. In this embodiment, the center rail 392 of the object-delivery and object-receiving portions of the conveying system, upstream and downstream of the weighing platform, are not continued and have no counterpart in the weighing platform.

The manner in which the main conveyor rails 388, 390 and 392 and the chain-supporting rails 324 and 326 are secured together upstream and downstream of the weighing platform is shown especially clearly in FIG. 8, wherein the head of bolt 400 is recessed in main rail 388 and extends through openings in chain-supporting rails 324 and 326 and central main rail 392 to main rail 390, with which it is threadedly engaged; spacers such as 402 between the several rails hold them in proper positions when bolt 400 is tightened. Another bolt 410 extends through main rail 388 and spacer 412 into threaded engagement with the lower portion of central main rail 392 to provide additional rigidity for the assembly.

As appears particularly clearly in FIGS. 7 and 9, the lugs 414 of chains 328 and 330 move upwardly around sprocket 342 from below the main conveyor rails 388, 390 and 392 in exact synchronism and phasing with the passage of the sliding cans in screw conveyor 61, so as to bear lightly against the bottom rims 418 of the cans, each pair of lugs contacting a can at positions equally spaced on opposite sides of the central axis of the can so as to exert no net turning torque or sideways deflecting force on the can when it is released from the screw conveyor. The lugs move horizontally in contact with the trailing surface of the can bottom rims, at the exact speed of their conveyance by the screw conveyor 61, so that when the cans exit from the downstream end of the screw conveyor 61 there is substantially no shock to, or change in speed of, the cans, and they slide substantially freely over the top of the weighing platform 68 with only a light guiding touch by the lugs.

The lugs such as 414 continue to guide the cans in lateral position and with fixed speed and spacing from the weighing platform onto the downstream main conveyor rails until they are fully under control of the synchronized downstream screw conveyor 70, to which the cans are delivered smoothly. At this point the lugs move downwardly around sprocket 340, to position out of contact with the cans; preferably the leading top corners of the lugs are rounded to effect a smooth release from contact with the cans.

Screw conveyor 70, as described previously, may accelerate or decelerate the cans, thereby changing their spacings in predetermined manner to assure smooth pick-up and delivery of the cans by downstream conveyor 73, through rejector 82 into closer 38, at exactly the times required for proper operations of rejector and closer.

Using such apparatus, it has been found that cans 4" high and 2 11/16" in diameter can be filled with 300 grams of food product to within about 7/32" of their top edges, weighed at rates of 300-600 cans per minute with an accuracy of about ±1%, and passed through a rejector and closing machine, all without any spillage of soup from the cans.

As illustrated by way of example in FIGS. 10 and 11, the invention in various of its aspects is applicable to a variety of overall systems. Thus FIG. 10 illustrates a system to which the invention in one form is applicable, in which the rejector follows, rather than precedes the closer, while FIG. 11 illustrates a case in which the closer precedes the weigher load cell and the closed cans are weighed.

While the invention has been described, in the interest of complete definiteness, with particular regard to specific embodiments thereof, it will be understood that it may be embodied in a variety of forms diverse from those specifically shown and described, without departing from the spirit and scope of the invention as defined by the appended claims.

What is claimed is:

1. Weighing and conveying apparatus, comprising:
   weighing means comprising a horizontal weighing platform spring-mounted so as to be free at all times to execute free vertical vibratory motion of small amplitude about its rest position in response to objects sliding in sequence across a top surface thereof from one end to the other, means responsive to said vertical vibratory motion for deriving signals representative of predetermined parameters of said motion, and means responsive to said parameter-representing signals for producing weight-indicating signals indicative of the individual weights of said objects;

object-delivery track means having a horizontal top surface adjacent one end of said platform which is substantially aligned with the highest level assumed by said top surface of said platform in response to presence of said objects thereon;

object-receiving track means having a horizontal top surface adjacent the other end of said platform which is substantially aligned with the lowest level of said top surface assumed by said platform in response to presence of said objects thereon;

a conveying system for smoothly sliding each of said objects in sequence along said top surface of said object-delivery track means, onto and along said top surface of said platform in substantially free sliding motion and then along said top surface of said object-receiving track means, while maintaining positive indexing contact with each of said objects;

said conveying system comprising (a) object-delivery conveyor means disposed along said object-delivery track means and contacting said objects in positive indexing relation to urge them slidingly along said top surface of said object-delivery track means in predetermined spaced relation to each other and at a predetermined speed;

(b) object-receiving conveyor means disposed along said object-receiving track means and contacting said objects in positive indexing relation to urge them slidingly along said top surfaces of said object-receiving track means in predetermined spaced relation to each other and at a predetermined speed;

(c) weigh conveyor means supported independently of said weighing platform and extending from said one end to said other end of said platform for contacting said objects in positive indexing relation to maintain a uniform speed and spacing of said objects delivered by said object-delivery conveyor means as they slide over said platform from said object-delivery conveyor means to said object-receiving conveyor means, said weigh conveyor means first contacting said objects prior to their exit from control by said object-delivery conveyor means and continuing to contact them in positive indexing relation until after they have entered the control of said object-receiving conveyor means; and (d) means for synchronizing and phasing the motion of said object-delivery conveying means, said object-receiving conveyor means and said weigh conveyor means to provide smooth uniform sliding motion of said objects from positions controlled by said object-delivery conveyor means, across said platform to positions controlled by said object-receiving conveyor means.

2. The apparatus of claim 1, wherein said objects are open-topped cans containing readily-flowable product.

3. The apparatus of claim 1, wherein said means for synchronizing and phasing comprise a common motive source and positive drive means connecting said source to drive said object-delivery conveyor means, said object-receiving conveyor means, and said weigh conveyor means.

4. The apparatus of claim 1, wherein said objects to be weighed are open-topped cans containing readily-flowable material; said apparatus comprising a positive-index can filler for filling said cans with said material as they move continuously through said filler, and for delivering said filled cans to said object-delivery conveyor with smooth sliding motion and at a predetermined speed and spacing.

5. The apparatus of claim 4, comprising a positive-index can closer supplied with said filled cans from said object-receiving conveyor.

6. The apparatus of claim 1, wherein said object-delivery conveyor means comprises a screw conveyor.

7. The apparatus of claim 6, wherein said screw conveyor is an accelerating conveyor having a uniform pitch at its exit end.

8. The apparatus of claim 6, wherein said object-receiving conveyor means is a screw conveyor.

9. The apparatus of claim 1, wherein said platform contains channel means extending longitudinally thereof, and said weigh conveyor comprises an endless-loop conveyor having a straight run extending along said channel means below the top of said platform and having uniformly-spaced outwardly extending members protruding upwardly through said channel means for contacting and guiding said objects across said platform.

10. The apparatus of claim 9, wherein said members are spaced apart from each other at intervals equal to the distance between the centers of said objects as they exit from said object-delivery conveyor means.

11. The apparatus of claim 10, wherein said endless-loop conveyor comprises endless chain means having a lower return run below said straight run.

12. A weighing and conveying device, comprising a weighing platform spring-mounted to execute vertical vibratory motion in response to the weights of objects sliding across a top surface thereof, said platform having longitudinally extending channel means therein, weigh conveyor means comprising support means extending through said channel means below the top surface of said platform and mounted independently of said platform, said weigh conveyor means extending through said channel means on said conveyor support means and having object-contacting means extending upwardly and through said channel means to contact and guide said objects along said platform.

13. The apparatus of claim 12, wherein said channel means comprises a central channel extending longitudinally through said platform.

14. The apparatus of claim 13, wherein said weigh conveyor support means comprises a pair of parallel rails and said weigh conveyor means comprises a pair of roller chains each rolling along a different one of said rails, said object-contacting means comprising lugs on said chains.

15. The apparatus of claim 13, wherein said top surface of said platform is in the form of narrow rails.

16. Apparatus for the high-speed conveying and weighing of open-topped containers, comprising:

a filler station for filling open-topped containers with product;

a weighing station comprising a high-speed weigher for weighing the filled open-topped containers;

a container-closing station for closing the tops of said container;

track means for slidingly supporting said containers in a sequential train, and extending from said filler station to said container-closing station;

said conveyor means comprising means for establishing guiding and controlling contact with each of said containers leaving said filling station and for maintaining such contact from said filler station to said container-closing station to control the position of each of said containers at all times.

17. The apparatus of claim 16, wherein said conveyor means are supported independently and free of said weigher as said containers slide on said weigher.

18. The apparatus of claim 16, wherein said conveyor means comprises a plurality of conveyors positively and synchronously driven and arranged to pass control of said sliding containers from one to another of said conveyors smoothly and without interruption of said control.

19. The apparatus of claim 16, wherein said conveyor means comprise means for controlledly changing the spacings between said containers during said sliding thereof from said filler station to said closer station.

20. The apparatus of claim 19, wherein said means for controlledly changing said spacing comprises screw conveyor means.

21. Weighing and conveying apparatus, comprising:
a weighing device comprising a weighing platform, for weighing objects sliding across said platform;

conveyor means for contacting the rearward side of each of said objects as it slides across said platform to guide it in its sliding motion; and means for supporting said conveyor means independently and free of said platform;

said conveyor means extending along and below the top of said platform and having guide members extending upward through said platform to effect said guiding of said sliding objects.

22. Apparatus for the high-speed conveying across a weighing platform objects to be weighed, comprising:
a weigher having a weighing platform, a delivery track and a delivery conveyor for sliding said objects smoothly along said track toward said weighing platform;

a weigh conveyor synchronized with said delivery conveyor and supported independently and free of said weighing platform, having object-contacting means for contacting said objects at their rear surfaces without shock thereto and for moving them slidingly, and without change of velocity, from said delivery conveyor and across said weighing platform.

23. The apparatus of claim 22, wherein said delivery conveyor comprises means for smoothly changing the velocity of said objects, and said object-contacting means extend upwardly through said platform into contact with said objects.

24. The apparatus of claim 22, wherein said object contacting means comprises lugs having rounded leading surfaces in contact with said cans, of a radius of curvature large enough to avoid accelerating the cans as they leave contact with said lugs at the exit end of said weigh conveyor.

* * * * *